United States Patent [19]

Ouchi et al.

[11] Patent Number: 4,509,336
[45] Date of Patent: Apr. 9, 1985

[54] AIR CONDITIONING APPARATUS

[75] Inventors: Yasumasa Ouchi, Nara; Shoji Otoshi, Sakai, both of Japan

[73] Assignee: Osaka Gas Company Limited, Osaka, Japan

[21] Appl. No.: 560,483

[22] Filed: Dec. 12, 1983

[30] Foreign Application Priority Data

Dec. 17, 1982 [JP] Japan .................. 57-222592

[51] Int. Cl.³ .............................................. F25B 15/00
[52] U.S. Cl. .................................... 62/112; 252/68
[58] Field of Search ..................... 62/112, 476, 502; 252/68

[56] References Cited

U.S. PATENT DOCUMENTS 2,041,741  5/1936  Bichowsky .......................... 62/112
3,478,530 11/1969  Aronson ............................. 62/112
4,019,992  4/1977  Krueger ........................... 62/112 X

OTHER PUBLICATIONS

Hainsworth, W. R. "Refrigerants & Absorbents" Refrigerating Engineering, vol. 48, Sep. 1944, (No. 2), pp. 204-205.

Primary Examiner—Lloyd L. King
Attorney, Agent, or Firm—Edwin E. Greigg

[57] ABSTRACT

The air conditioning apparatus according to the invention comprises an absorption type heat pump comprising a system including an absorber, a regenerator, a condenser and an evaporator. A mixture of lithium bromide and zinc chloride is used as an absorbent which is dissolved to form an absorbent solution into a mixed solvent having a ratio by weight of methanol to water, the ratio falling in a range between 0.1 and 0.3. Said solution is circulated through the system.

2 Claims, 2 Drawing Figures

AIR CONDITIONING APPARATUS

BACKGROUND OF THE INVENTION

The invention relates to an air conditioning apparatus, and more particularly to an air conditioning apparatus which has an absorption type heat pump functioning as an essential part thereof.

There are known some absorption type heat pumps in which lithium bromide is used as an absorbent dissolved in a coolant, the coolant being water. Such known heat pumps could not be employed in air conditioning apparatuses in order for air heating during cold seasons when a running temperature within an evaporator fell to some degrees below 0° C. and the coolant water froze therein due to low outdoor temperature.

Therefore, it has been proposed to utilize pure methanol as the coolant so as to solve the abovedescribed problem. The evaporation heat of methanol is however comparatively less than that of water so that refrigerating capacity of such apparatus is unavoidably reduced to some extent thereby resulting in a scale-up of said apparatus.

SUMMARY OF THE INVENTION

The invention aims at solution of the aforementioned problems.

A primary object of the invention is therefore to provide an air conditioning apparatus having an absorption type heat pump incorporated therein and adapted for air heating even at a lower outdoor temperature and an evaporator temperature below 0° C.

Another object of the invention is to provide an air conditioning apparatus having an absorption type heat pump comprising an evaporator for evaporation of a coolant, an absorber containing a solution of an absorbent dissolved in the coolant, the solution absorbing coolant vapor flowing into the absorber from the evaporator, a regenerator for boiling and concentrating the absorbent soluton diluted in the absorber, and a condenser adapted to condense coolant vapor flowing thereinto from the regenerator wherein the absorbent solution is recirculated into the absorber after condensed by said regenerator, characterized in that the absorbent is a mixture of lithium bromide and zinc chloride and that the coolant is a mixed solvent composed of water and methanol.

In a preferred embodiment of the invention, the mixed solvent has a ratio by weight of methanol to water, the ratio falling in a range between about 0.1 and about 0.3, said ratio being that measured on the absorbent solution in the evaporator.

According to the invention, a temperature within the evaporator can be set at some degrees below 0° C. even when the outdoor temperature is remarkably low. This is an effect of the compositions of the absorbent and the coolant, i.e. said absorbent mixture of lithium bromide and zinc chloride and said coolant mixture of water and methanol. The heat pump in the invention can now be operated for air heating at such a low outdoor temperature that the known coolant, i.e. water, would otherwise freeze in known apparatuses. Besides, an air cooling capacity of the heat pump is not affected very much but maintained at a sufficiently high level by the abovedescribed compositions of the absorbent and the coolant. Furthermore, a temperature within the absorber can also be set, without any crystallization problem, at a higher temperature than in a known system utilizing only lithium bromide as the absorbent. Said higher temperature of the absorber affords a higher temperature in air heating.

Other objects and advantages will become clear in the following description of an embodiment by referring to the drawings, in which:

FIG. 1 is a schematic illustration of an absorption type heat pump utilized as an essential part of an air cooling and heating apparatus; and FIG. 2 is a diagram showing an operation condition in an embodiment of the invention.

DETAILED DESCRIPTION OF THE PREFERRED EMBODIMENT

The general principle in operation of an absorption type heat pump will be explained at first prior to description of the embodiment.

Figure 1:
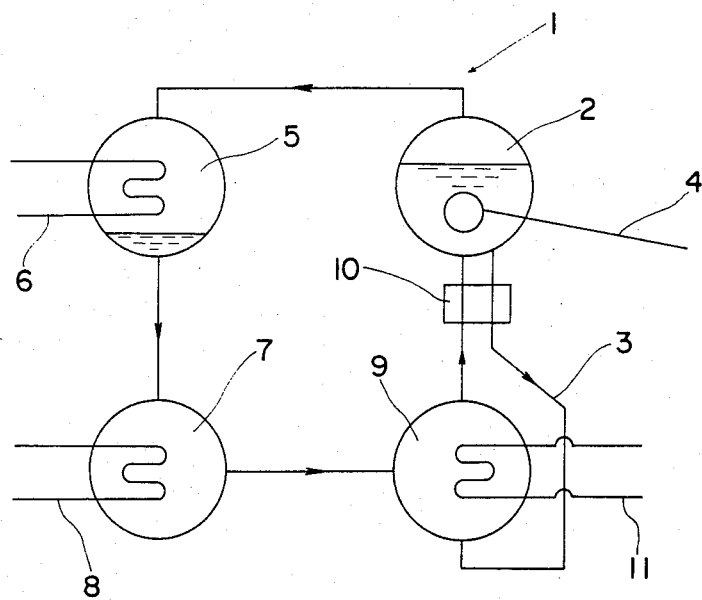

As shown in FIG. 1, the heat pump 1 is in operation for air heating and comprises a regenerator 2 to which fuel of a kind such as town gas is supplied through a pipe 4. Combustion heat of the fuel gas is a heat source for driving the heat pump. The heat causes a coolant to evaporate within said regenerator 2. Vapor of the coolant is introduced into a condenser 5 so as to condense therein giving an amount of condensation heat to cooling water flowing through a coiled tube 6. The coolant thus liquefied will then be delivered to an evaporator 7 which is kept at a pressure lower than that in the condenser. The coolant evaporates under this pressure thereby taking an amount of evaporation heat from water which is flowing through another coiled tube 8. The water thus cooled in said tube 8 is then subjected to a heat exchange process between atmosphere and cold water by means of an outdoor unit, or may be utilized for air cooling. On the other hand, vapor of the coolant flows from the evaporator 7 into an absorber 9 so as to be absorbed therein by an absorbent solution which has been concentrated in the regenerator 2 and is flowing into said absorber through a pipe 3. A considerable amount of absorption heat will be liberated and given to water which is flowing through a further coiled tube 11. The heated water within said tube 11 is subjected to a further heat exchange process between the room air and said heated water by means of an indoor unit not shown. Air heating is thus effected by the indoor unit. The condensation heat liberated in the condenser 5 can also be made use of for air heating. The absorbent solution which has absorbed the coolant vapor flows then into the aforementioned regenerator 2 via a heat exchanger 10. This cycle will be continued for air heating.

In case of air cooling, an amount of heat of room air is taken up by the evaporator 7 while the absorption heat generating in the absorber 9 thereby being radiated into outdoor atmosphere together with the condensation heat generating in the condenser.

When the atmosphere temperature is only at some degrees above 0° C., temperature of the evaporator 7 should be set at some degrees below 0° C. The coolant, i.e. water, inevitably freezes in the evaporator in such a condition thereby making it impossible to operate the pump, if lithium bromide is used as the absorbent and water is the coolant as is in the known air cooling and heating systems which utilize the absorption type heat pump.

The invention will now be described below in detail.

A novel air cooling and heating apparatus according to the invention comprises an improved heat pump of absorption type in which a coolant is composed of methanol dissolved in water and a mixture of lithium bromide and zinc chloride is used as an absorbent. Freezing point of the coolant descends to a certain degree by dissolving methanol into water whereby the coolant can be prevented from freezing even at some degrees below 0° C. The mixing of methanol into water has proved to be of no bad influence on the system from a practical point of view. When a weight ratio CI of methanol to water is 0.1, 0.2 or 0.3, the freezing point of the coolant is $-5.7°$ C., $-14.5°$ C. or $-25.9°$ C., respectively. Accordingly, the evaporator temperature can be set at about $-5°$ C. to $-25°$ C. if the coolant contains methanol at the weight ratio CI of about 0.1 to 0.3, the ratio being measured on the absorbent solution in the evaporator. It is possible with such a coolant to effectively operate the heat pump even when the outdoor temperature is considerably low in winter. Contrary to this, the coolant would have a freezing point above $-6°$ C. when its CI value were smaller than 0.1, this resulting in a possible evaporator temperature higher than $-6°$ C. which cannot permit the heat pump to be operated at a considerably low outdoor temperature. Though the freezing point of the coolant becomes lower than $-26°$ C. with its CI value greater than 0.3, it would be scarcely necessary to adopt such a low evaporator temperature in most countries of the temperate zone and the subarctic zone.

On the other hand, a mixture of lithium bromide and zinc chloride is employed as the absorbent in the invention so that crystallization temperature at which the absorbent begins to crystallize is lower than that in case of using lithium bromide only. This lower crystallization temperature makes it possible to increase a concentration of the absorbent and consequently to raise the temperatures within the absorber and of air heating. The lowest crystallization temperature will be obtained when a weight ratio CII of zinc chloride to lithium bromide is 1, thus providing a possibility to employ the highest absorber temperature. If the value CII is smaller than 0.8 or greater than 1.2, the extent to which the crystallization temperature descends would be not sufficient for a desired high temperature in the absorber.

Figure 2:
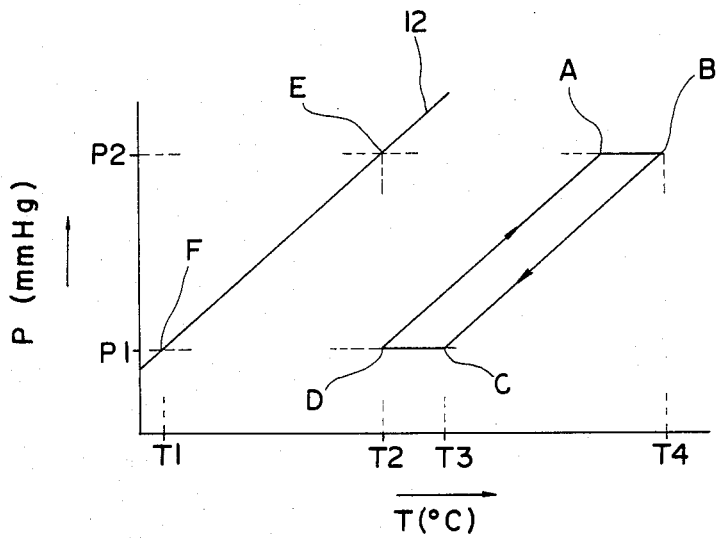

FIG. 2 is a diagram illustrating an operation condition of the apparatus in the invention. In this embodiment the value CII of the absorbent is set at 1 with the value CI of the coolant set at 0.1. The temperatures T° C. of said absorbent solution and coolant are indicated on the transversal axis of abscissa of the diagram whereas the pressures P mmHg thereof are indicated on the vertical axis of abscissa. The line 12 shows a vapor pressure curve of the coolant, i.e. mixture of methanol and water.

For example, the temperature $T_2$ shall be set at 53° C. for the condenser 5 and an outlet of the absorber 9 in accordance with a given temperature which is to be maintained in a room or rooms by air heating. The pressures $P_2$ within the condenser 5 and the regenerator 2 are thus 156 mmHg as read form the line 12. If the temperature within the evaporator 7 is set at for example $-2°$ C. which is lower than the outdoor temperature and has been impossible in the known apparatuses, the pressures $P_1$ within the evaporator 7 and the absorber 9 will be 7 mmHg as read also from the line 12. It is supposed that the temperature $T_3$ at an inlet of the absorber 9 is set at for instance 58° C. at which the absorbent does not crystallize.

A circulation cycle of the absorbent solution is illustrated by a loop line passing through points A, B, C, and D wherein a line AB shows a concentration process effected between an inlet into and an outlet from the regenerator 2. Another line CD shows an absorption process effected within the absorber 9 to absorb the coolant vapor into the absorbent solution. A point E indicates a state of the coolant during a condensation process effected in the condenser 5 whereas another point F indicates a state of the coolant during a vaporization process effected in the evaporator 7. A concentration of the absorbent in said absorbent solution measured on the points D and A can be estimated to be 77% by means of the temperature $T_2$ at the outlet of the absorber 9 and the pressure $P_1$ within said absorber 9. Another concentration of the absorbent on the points B and C will be 80% as similarly estimated from the temperature $T_3$ at the inlet of said absorber 9 and the pressure $P_1$. A temperature $T_4$ at the outlet of the regenerator 2 can be estimated to be 135° C. from the pressure $P_2$ and the concentration 80%.

Another cycle AEFD in FIG. 2 represents a thermodynamic change in state of the coolant wherein a line AE shows the vaporization in the regenerator and another line FD shows the absorption in the absorber.

It will be now understood that the heat pump in the invention can be successfully operated, as is in the above example, even if the evaporator temperature $T_1$ is set at two degrees below 0° C. which temperature has been impossible to be adopted in the known apparatuses. Such an air heating operation is effected with the outlet temperature $T_2$ of the absorber at 53° C. Moreover, the temperatures $T_2$ and $T_3$ of said absorber 9 can be maintained sufficiently high for air heating and without a problem of crystallization because the exemplified absorbent is the mixture composed of lithium bromide and zinc chloride with the same parts by weight thereof (i.e. CII = 1).

Although the above embodiment is described as to the first kind or class of heat pump, the invention can be embodied not only into a second kind or class of absorption type heat pump but also into a heat pump of multi-stage absorption type.

Furthermore, the invention can be applied also to an air cooling apparatus or to an air heating and/or cooling apparatus adapted to supply hot water.

We claim:

1. An air condition-heating apparatus including an absorption type heat pump which comprises:
    an absorber containing an absorbent solution of an absorbent dissolved in a coolant,
    a regenerator interconnected with said absorber for flow of said absorbent solution between said absorber and said regenerator and for vaporizing said coolant,
    a condenser interconnected with said regenerator for receiving coolant vapors vaporized in said regenerator and for condensing said vapors,
    an evaporator interconnected with said condenser for receiving and evaporating condensate from said condenser, and for directing coolant vapors from said evaporator to said absorber for absorption therein,
    said absorbent solution including a mixture of lithium bromide and zinc chloride and said coolant is a solvent mixture of water and methanol, which has a ratio by weight of methanol to water in which the ratio ranges from about 0.1 to about 0.3 with the ratio measured on said absorbent solution in said evaporator.

2. An air conditioning apparatus as defined in claim 1, wherein the mixture of lithium bromide and zinc chloride has a ratio by weight of zinc chloride to lithium bromide, the ratio falling in a range between 0.8 and 1.2.

* * * * *